(12) United States Patent
Atsuta et al.

(10) Patent No.: US 7,348,544 B2
(45) Date of Patent: Mar. 25, 2008

(54) OPTICAL ENCODER WITH DISCONTINUOUS OPTICAL GRATING

(75) Inventors: Akio Atsuta, Yokohama (JP); Masahiko Igaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 11/152,412

(22) Filed: Jun. 14, 2005

(65) Prior Publication Data
US 2005/0274880 A1  Dec. 15, 2005

(30) Foreign Application Priority Data
Jun. 15, 2004   (JP)   ............................ 2004-177407

(51) Int. Cl.
*G01D 5/34* (2006.01)
(52) U.S. Cl. ........................ 250/231.13; 250/231.18; 250/237 G; 356/619
(58) Field of Classification Search .......... 250/231.13, 250/231.18, 237 G; 356/619; G01D 5/38
See application file for complete search history.

(56) References Cited

U.S. PATENT DOCUMENTS

| | | | | |
|---|---|---|---|---|
| 5,291,133 A * | 3/1994 | Gokhale et al. | ....... | 324/207.25 |
| 5,569,913 A * | 10/1996 | Ishizuka et al. | ........ | 250/237 G |
| 5,929,789 A | 7/1999 | Barbehenn | | |
| 6,043,483 A * | 3/2000 | Schreiber | ................ | 250/231.13 |
| 6,175,414 B1 * | 1/2001 | Holzapfel et al. | .......... | 356/620 |
| 6,198,534 B1 * | 3/2001 | Hofer et al. | ................. | 356/399 |
| 6,201,239 B1 * | 3/2001 | Yamamoto et al. | .... | 250/231.14 |
| 6,396,052 B1 * | 5/2002 | Barry et al. | ........... | 250/231.13 |
| 6,660,997 B2 * | 12/2003 | Laberge et al. | ......... | 250/231.18 |
| 6,713,756 B2 * | 3/2004 | Yamamoto et al. | .... | 250/231.13 |
| 7,132,647 B2 * | 11/2006 | Atsuta et al. | ........... | 250/231.16 |
| 2002/0122186 A1 | 9/2002 | Igaki | | |
| 2003/0218125 A1 * | 11/2003 | Igaki et al. | ............. | 250/231.13 |
| 2004/0135077 A1 * | 7/2004 | Hane | ...................... | 250/231.13 |
| 2004/0262502 A1 * | 12/2004 | Martenson et al. | .... | 250/231.13 |
| 2005/0109924 A1 * | 5/2005 | Christenson et al. | .. | 250/231.13 |

FOREIGN PATENT DOCUMENTS

| | | |
|---|---|---|
| JP | 3-92716 A | 4/1991 |
| JP | 10-009895 | 1/1998 |
| JP | 10-318790 A | 12/1998 |
| JP | 2002-323347 A | 11/2002 |
| JP | 2003-161645 A | 6/2003 |
| WO | WO-9103711 A1 | 3/1991 |

OTHER PUBLICATIONS

Agilent Technologies, Inc. "Agilent HEDS-9202 Two Channel Optical Incremental Encoder Modules 2000 LPI Analog Output Data Sheet". Jul. 26, 2002 [retrieved Jul. 2, 2007]. Retrieved from the Internet: <http://www.avagotech.com/assets/downloadedDocument.do?id=3487 >.*

* cited by examiner

*Primary Examiner*—Georgia Epps
*Assistant Examiner*—Seung C Sohn
(74) *Attorney, Agent, or Firm*—Canon U.S.A. Inc I.P. Div

(57) ABSTRACT

An optical encoder includes a light-emitting unit, a scale with a discontinuous part, and a plurality of light-receiving elements arranged in relationship to a pitch of the scale. In the optical encoder, a light beam from the light-emitting unit reflects off the scale, and is received at the light-receiving elements. As a result of the processing of signals from the light-receiving elements, the discontinuous part is detected and the origin detection can be achieved.

6 Claims, 9 Drawing Sheets

OPTICAL ENCODER WITH DISCONTINUOUS OPTICAL GRATING

BACKGROUND OF THE INVENTION

1. Field of the Invention

The present invention relates to an optical encoder to be used for displacement measurement and angle measurement.

2. Description of the Related Art

An optical encoder includes a main scale provided with a first optical grating; an index scale facing the main scale and provided with a second optical grating; a light source illuminating the main scale; and photoreceptors subjected to light that is transmitted or reflected off the first optical grating of the main scale and is further transmitted through the second optical grating of the index scale.

In optical encoders of this type, an optical encoder having an index scale combined with photoreceptor arrays is proposed in Japanese Patent Publication No. 6-56304. An encoder with such a structure is also disclosed in Japanese Patent Laid-Open No. 2003-161645 by the present inventors.

An encoder with the above-described structure is called an incremental encoder, which is capable of detecting the amount of travel of the scale based on fluctuations in pulse.

A disadvantage of such an incremental encoder is that it requires an additional sensor for detecting the absolute position, as the absolute position of the rotation angle is not known. A solution to this is disclosed in Japanese Patent Laid-Open No. 10-318790 (corresponding to U.S. Pat. No. 5,929,789).

Figure 13:
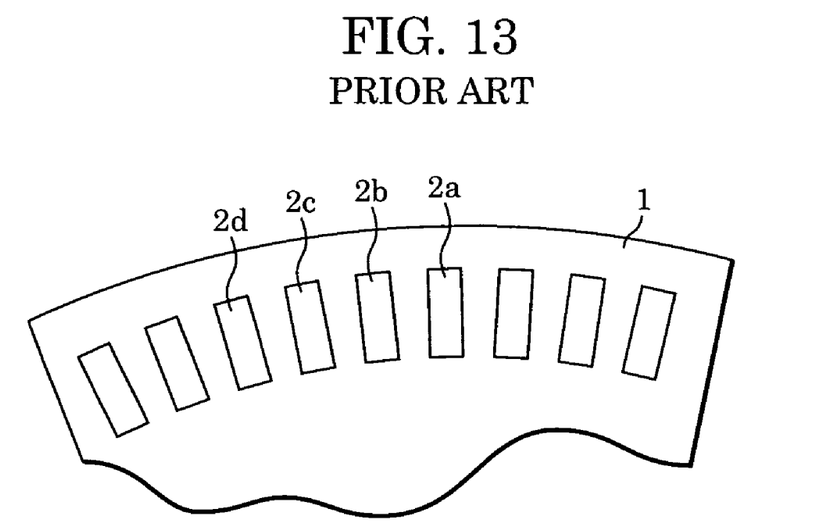
FIG. 13 is a diagram showing the structure of a scale of a known optical encoder.

This document discloses an incremental transmission encoder in which, as shown in FIG. 13, slits of varying transmittance are arranged in a scale 1 to detect the absolute position. For example, the transmittance of a slit 2a is set to 1, and the transmittance of the other slits gradually decreases in the order of a slit 2b, a slit 2c, and a slit 2d.

Figure 14:
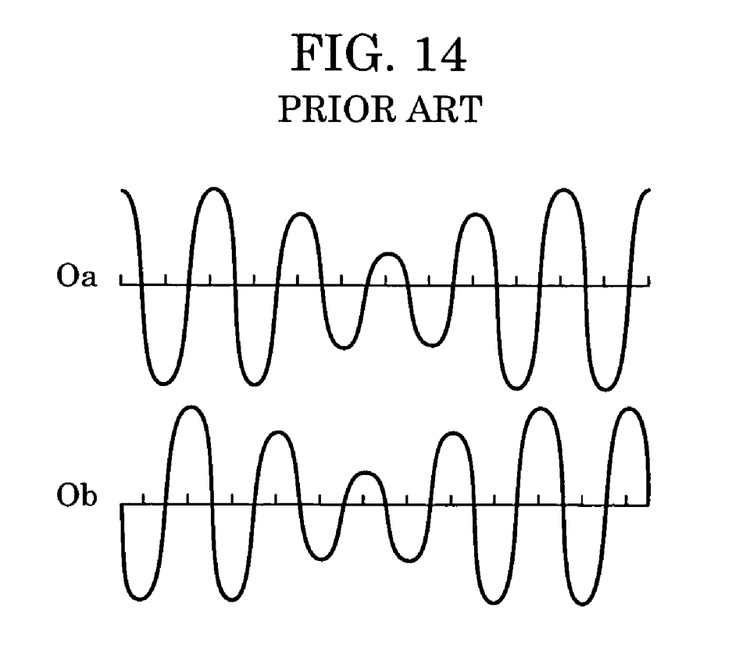
FIG. 14 shows an output waveform of an encoder signal obtained when a portion with slits of varying transmittance on the scale passes through a sensor.

FIG. 14 shows signal fluctuations that can be obtained, using the scale 1, when a portion with the slits of varying transmittance passes through a sensor. Since the amplitude of two-phase analog signals Oa and Ob obtained from the sensor is reduced as the transmittance of the slits gradually decreases, the absolute position can be determined by detecting the change in amplitude.

In the detection of signal amplitude to determine the absolute position using the known encoder described above, there is a need to carry out sampling at intervals well shorter than one period of the encoder signal to be obtained, in order to determine the voltage at the peak and valley of the signal obtained. This processing requires a large-scale circuit, such as a high-speed A/D converter.

Moreover, a portion with varying transmittance needs to be created, on the scale, with a high degree of accuracy. There is a possibility that considerable variations in actual amplitude change may result.

SUMMARY OF THE INVENTION

The present invention is directed to an optical encoder with a scale and a discontinuous part having a simple structure.

The present invention is also directed to an optical encoder that can stably detect the position of the discontinuous part, which is provided in the scale, as an origin, through the use of signals and signal processing that are free from the influence of environmental changes.

In one aspect of the present invention, an optical encoder includes a scale with an optical discontinuous part and an optical grating having a pitch, a plurality of light-receiving elements arranged in relationship to the pitch of the optical grating, a light-emitting unit for applying a light beam via the scale to the light-receiving elements, the scale being movably disposed relative to the light-receiving elements and the light-emitting unit, a signal processing circuit processing signals obtained from the light-receiving elements, and an origin-position detecting unit detecting an origin position of the optical encoder based on an output from the signal processing circuit. The origin-position detecting unit of the optical encoder detects a change in output of the signal processing circuit when the discontinuous part passes the light-receiving elements and the light-emitting unit, and detects the origin position when the changes occur.

In some embodiment, in detecting an absolute position, the optical encoder can detect the position of the discontinuous part of the scale by detecting changes in output signals from the light-receiving elements or changes in center voltage, thereby detecting the absolute position of the scale with a simple electrical circuit.

Further features and advantages of the present invention will become apparent from the following description of exemplary embodiments with reference to the attached drawings.

DESCRIPTION OF THE EMBODIMENTS

The present invention will now be described in detail based on embodiments illustrated in the drawings.

First Embodiment

Figure 1:
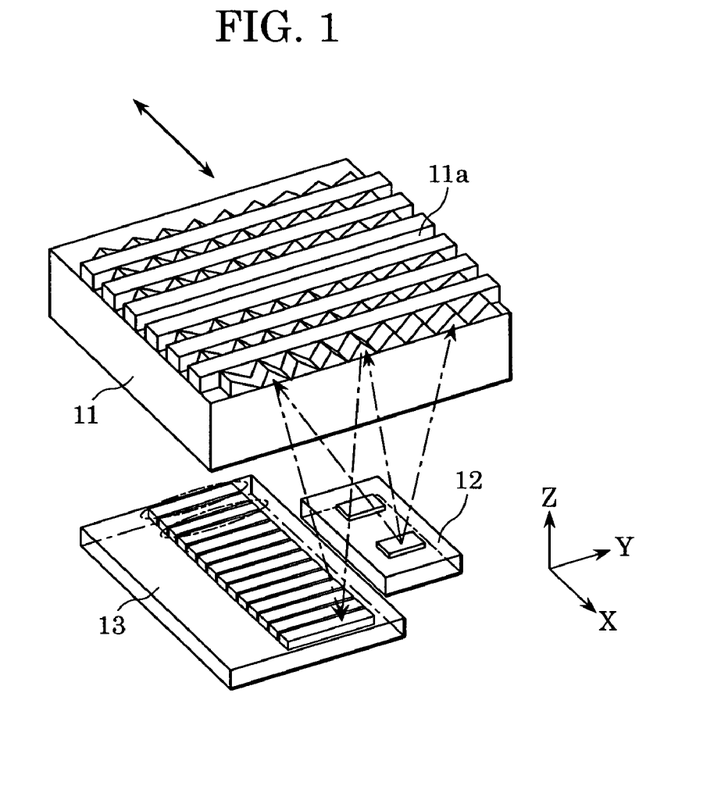
FIG. 1 is a diagram showing the structure of an optical encoder according to a first embodiment.

FIG. 1 is a perspective view of an optical encoder having a reflective scale formed of a micro-roof-mirror array. The optical encoder of the first embodiment has a reflective-type structure, which is contrary to known optical encoders having a so-called transmission-type structure in which a light-emitting unit and a light-receiving unit face each other with a scale interposed therebetween. Since a scale 11 is formed of the micro-roof-mirror array, the efficiency of light use is improved. The micro-roof-mirror array is disclosed in Japanese Patent Laid-Open No. 2002-323347 (corresponding to U.S. patent application Ser. No. 2002-122186).

A light-emitting unit 12 and a light-receiving unit 13 on which a plurality of light-receiving elements is arranged in stripes are secured in position on one side of the scale 11, which is movable. Light emitted from the light-emitting unit 12 reflects off the scale 11 having reflective and non-reflective portions arranged in close proximity to each other, and forms the distribution of light and shade on the stripes of light-receiving elements on the light-receiving unit 13 shown in FIG. 2. If the scale 11 is not formed of the micro-roof-mirror array and simply has reflective and non-reflective portions, a similar distribution of light and shade with a different signal level is formed on the light-receiving unit 13, so that encoder signals can be obtained.

Instead of the portion with varying transmittance as in the known scale described above, the scale 11 of the first embodiment is provided with a discontinuous part 11a which no beam of light can pass through. The reason why the known scale has the portion with varying transmittance is to ensure a certain degree of signal amplitude, because a portion with no transmission causes errors due to the loss of signals.

Figure 2:
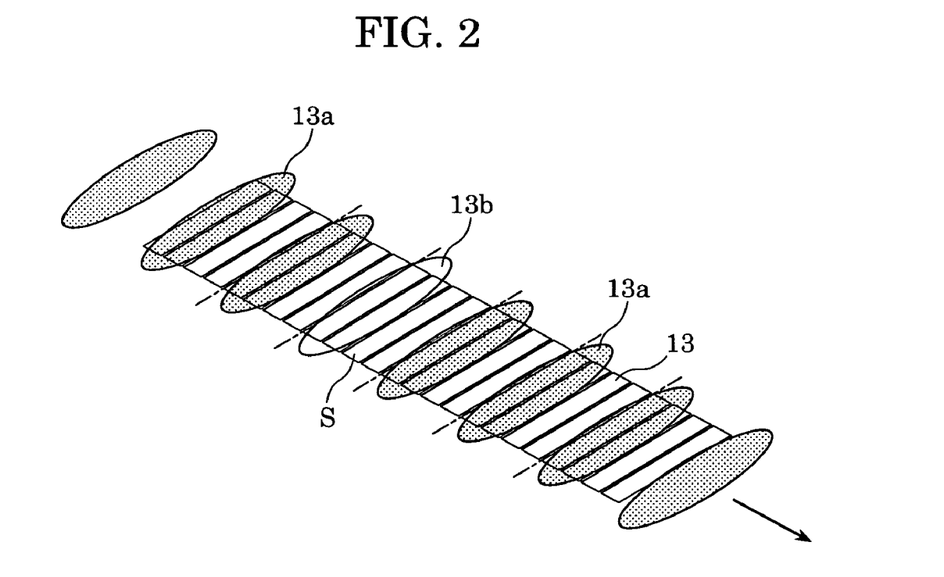
FIG. 2 shows the relationship between the pattern of a photodiode array and the detected pattern of light and shade.

The light-receiving unit 13 shown in FIG. 2 is provided with a plurality of segments, each containing four photodiodes S. Light reflects off the scale 11 and reaches the light-receiving unit 13. Areas 13a are exposed to high intensity light. In a normal encoder, the areas 13a are distributed in a certain relation to the pitch of the micro-roof-mirror array of the scale 11. However, in the first embodiment, the areas 13a subjected to high intensity light are distributed at the same pitch as that of the segments each containing four photodiodes S.

Since the discontinuous part 11a is provided in the scale 11 in the first embodiment, an area 13b that should have been exposed to high intensity light is omitted. However, even if a wave of incident light corresponding to the discontinuous part 11a is completely omitted, a signal amplitude can be obtained according to the extent to which other photodiodes S remain.

Figure 3:
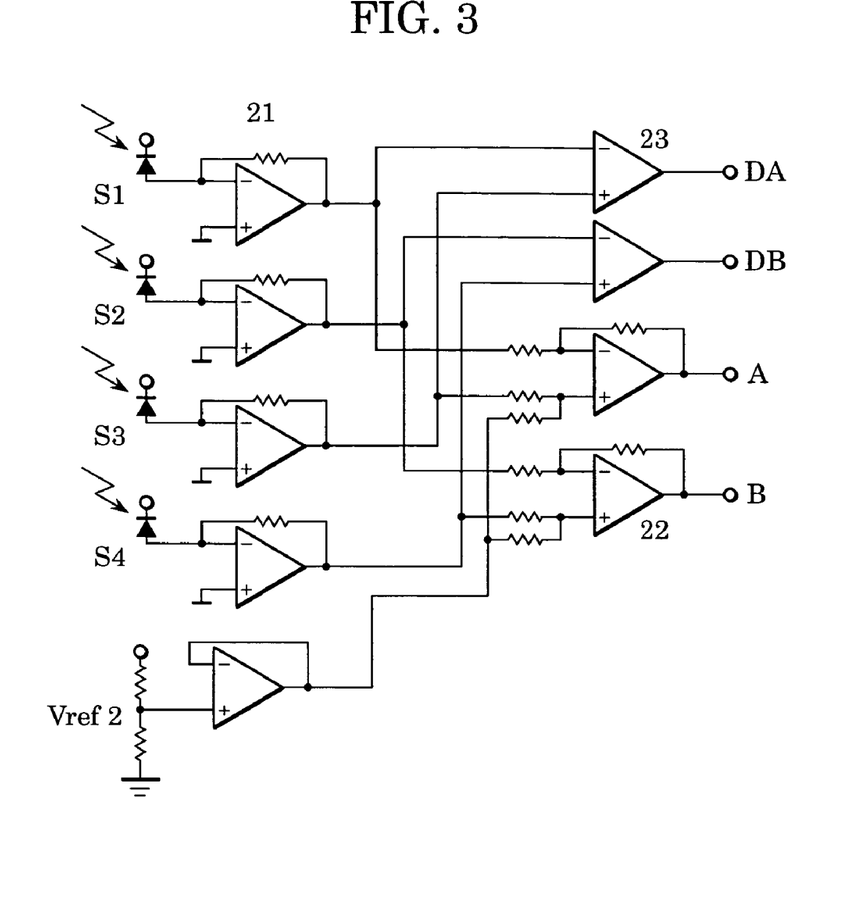
FIG. 3 is a diagram showing the configuration of a processing circuit.

FIG. 3 is a circuit diagram of the present embodiment. The outputs of respective photodiodes S1 to S4 are connected to respective current/voltage converters 21. The photodiodes S1 to S4 output signals with a phase difference of 90 degrees. Signals from the photodiodes S1 and S3 with a phase difference of 180 degrees, and signals from the photodiodes S2 and S4 with a phase difference of 180 degrees, are input to the positive and negative terminals of two differential amplifiers 22 and two comparators 23, and binarized. Analog encoder signals (hereinafter referred to as analog signals) A and B and digital encoder signals (hereinafter referred to as digital signals) DA and DB can thus be obtained.

Figure 4:
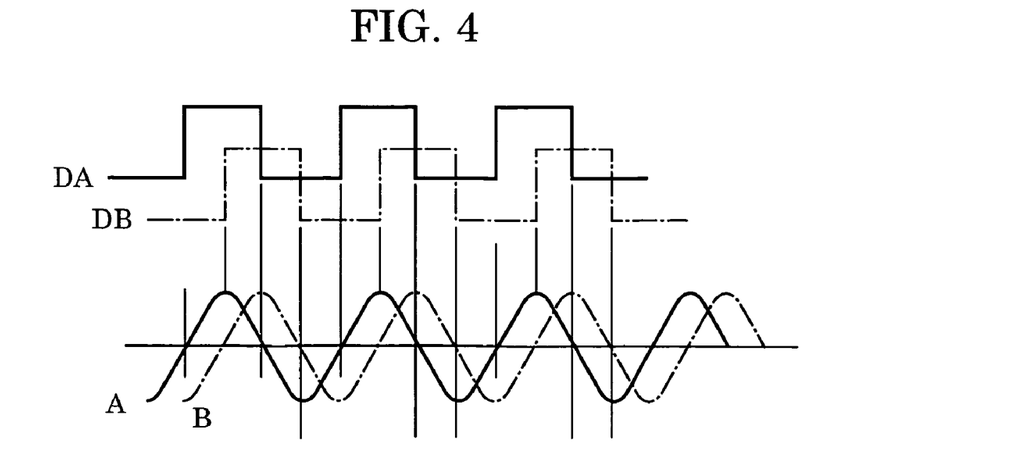
FIG. 4 is a timing chart for digital and analog signals.

FIG. 4 is a timing chart for the signals obtained from the circuit diagram in FIG. 3. Since the digital signals DA and DB are generated in synchronization with zero-crossing points of the respective analog signals A and B, and there is a phase difference of 90 degrees between the analog signals A and B, the rise and fall of the digital signal DB correspond to the maximum and minimum values of the analog signal A, respectively.

Therefore, the maximum and minimum values of the analog signal A can be obtained if the analog signal A is sampled in synchronization with every pulse edge of the digital signal DB.

The amplitude of the analog signal A can be determined by subtracting the minimum value of the analog signal A from the maximum value of the analog signal A. The center voltage of the analog signal A can be determined by dividing the sum of the maximum value of the analog signal A and the minimum value of the analog signal A by two.

Figure 5:
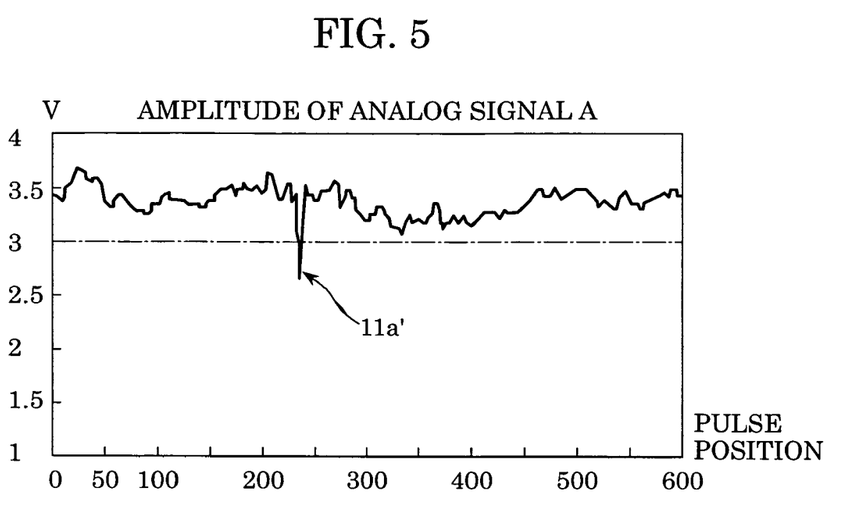
FIG. 5 is a waveform diagram showing the amplitude of an analog signal.

FIG. 5 is a waveform diagram showing the resulting amplitude of the analog signal A. In the data for 600 pulses/rotation (R), a point 11a' corresponding to the discontinuous part 11a in FIG. 1 appears once per rotation at a position of about the 230th pulse.

As shown, the signal amplitude decreases when the discontinuous part 11a passes through a sensor (i.e., the discontinuous part 11a passes the light emitting unit 12 and the light receiving unit 13 in the rotation (movement) of the scale 11). When one segment is composed of four photodiodes S1 to S4, signals corresponding to one segment out of six segments as in FIG. 2 are not input. Therefore, the signal level in FIG. 5 is five-sixths of the signal level in the case where no discontinuous part 11a is provided.

If, for example, the signal level falls below 3V or the amplitude reaches the minimum value in FIG. 5, a computation unit of a microcomputer or the like determines that the origin is detected, and then stores the position at this point, or outputs a pulse signal through a comparator.

The origin position can thus be detected by providing the discontinuous part 11a in the scale 11, and sampling the analog signal A, with reference to the digital signal DB, to compute the amplitude.

Figure 6:
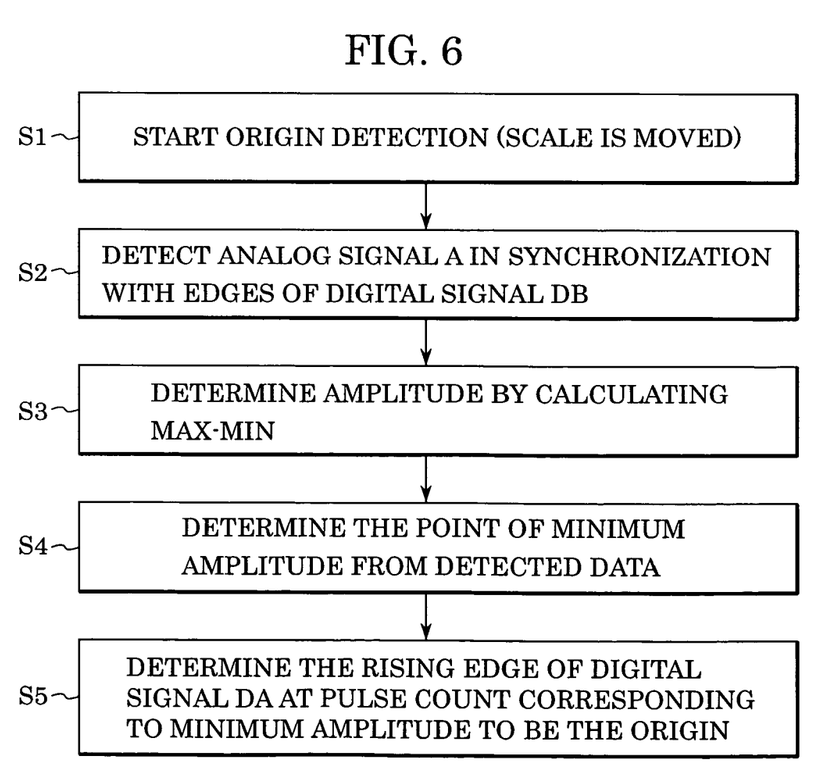
FIG. 6 is a flowchart of an algorithm for origin detection.

FIG. 6 is a flowchart of an algorithm for the origin detection according to the first embodiment. The origin detection starts in step S1, where the scale 11 is moved to generate signals.

In step S2, the analog signal A is detected in synchronization with the rising and falling edges of the digital signal DB to determine the maximum and minimum values of the analog signal A.

In step S3, the amplitude is determined by subtracting the minimum value from the maximum value.

In step S4, a point at which the amplitude reaches its minimum value is detected.

In step S5, the rising edge of the digital signal DA at a pulse count corresponding to the minimum amplitude is determined to be the origin.

The origin position with good reproducibility can thus be obtained with a high degree of accuracy, by determining a certain pulse edge of a digital signal to be the origin.

Second Embodiment

Figure 7:
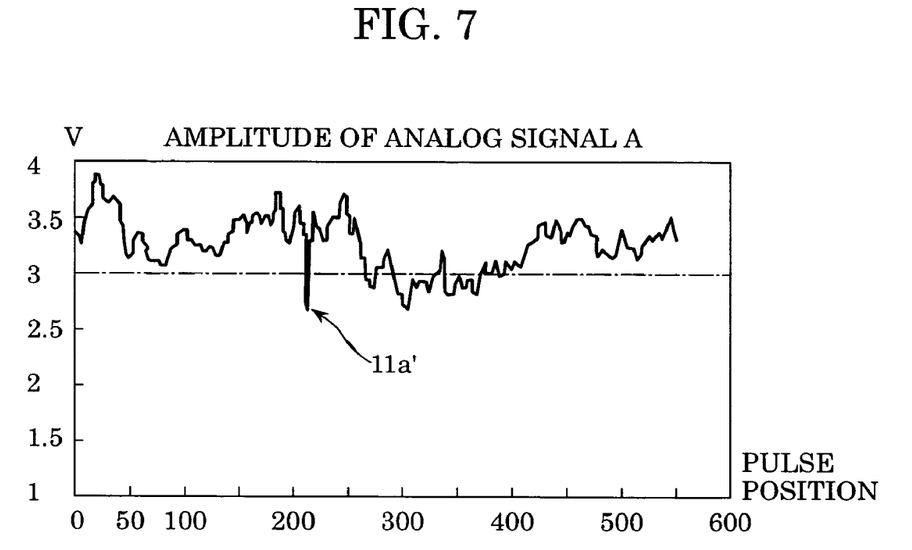
FIG. 7 is a waveform diagram showing fluctuations in an analog signal amplitude where the origin is undetectable.

FIG. 7 is a waveform diagram showing amplitude fluctuations where the discontinuous part 11a is undetectable in the first embodiment. Although the discontinuous part 11a is provided in the scale 11, there is a possibility that amplitude fluctuations in other parts are too large to detect the discontinuous part 11a even if a signal level falling below a predetermined value or the minimum amplitude is calculated in the first embodiment.

To solve this problem caused, for example, by dirt on the scale 11 and low accuracy in installation, the encoder needs to be used in an environment free from dust and dirt, and a precise adjustment is required in the assembly process.

In the second embodiment, detected signals are differentiated to identify a steep change in amplitude when the discontinuous part 11a passes through the sensor (i.e., the discontinuous part 11a passes the light emitting unit 12 and the light receiving unit 13 in the rotation of the scale 11), in order that the discontinuous part 11a, which is the origin of the scale 11, can be detected even if fluctuations in amplitude are large.

Figure 8A:
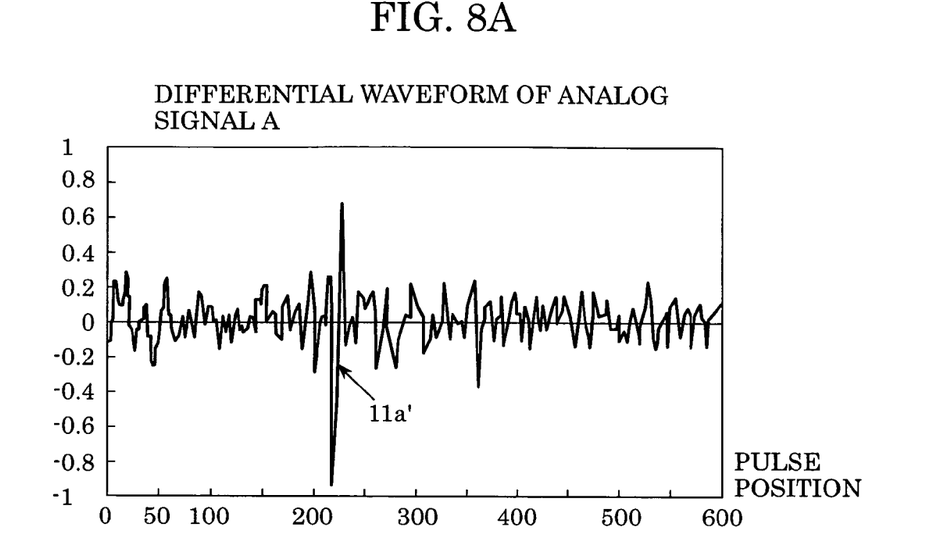
FIGS. 8A and 8B are waveform diagrams showing a signal obtained by the differentiation of an analog signal according to a second embodiment.
Figure 8B:
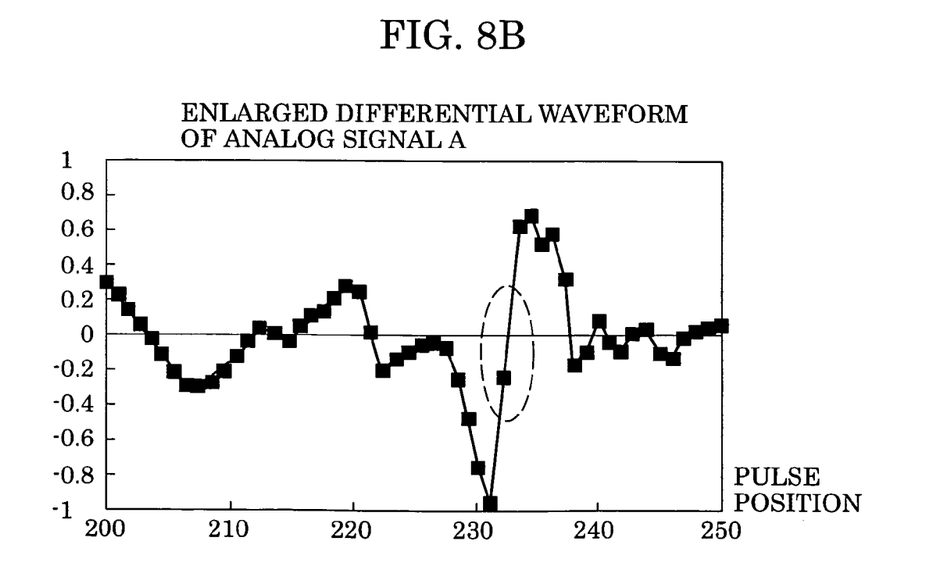

FIGS. 8A and 8B show the result of the differentiation of the analog signal A shown in FIG. 7. FIG. 8A is the entire waveform showing the differentiated signal. FIG. 8B is a waveform diagram showing abrupt fluctuations in the amplitude of the differentiated signal when the discontinuous part 11a passes through the sensor.

As shown in FIG. 8A, the differential value fluctuates dramatically when the discontinuous part 11a of the scale 11 passes through the sensor (i.e., the discontinuous part 11a passes the light emitting unit 12 and the light receiving unit 13 in the rotation of the scale 11). This corresponds to a momentary drop in actual amplitude. FIG. 8B expands the horizontal axis of an area where the differential value changes dramatically. Dots on the curve represent values corresponding to every pulse of the encoder signal.

Then, a microcomputer or the like searches the differential values, for example, in FIG. 8B, within the range from just below −0.5 to just above 0.5 to find a differential value closest to zero. Thus, the 232nd pulse position circled with a dotted line in FIG. 8B can be selected as the origin.

This pulse position can be set as the origin, from then on, by subtracting 232 from the pulse count initially counted. An accurate origin position can thus be obtained by determining an edge of the digital signal DA, the edge corresponding to this pulse count, as the origin position.

Third Embodiment

Figure 9A:
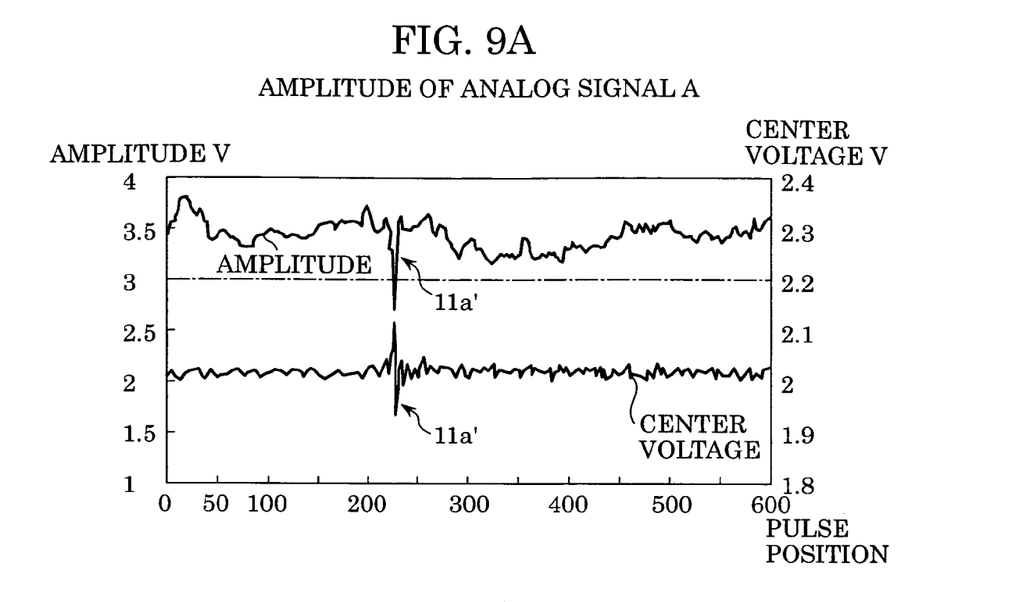
FIGS. 9A and 9B are waveform diagrams showing the amplitude and center voltage of an analog signal according to a third embodiment.
Figure 9B:
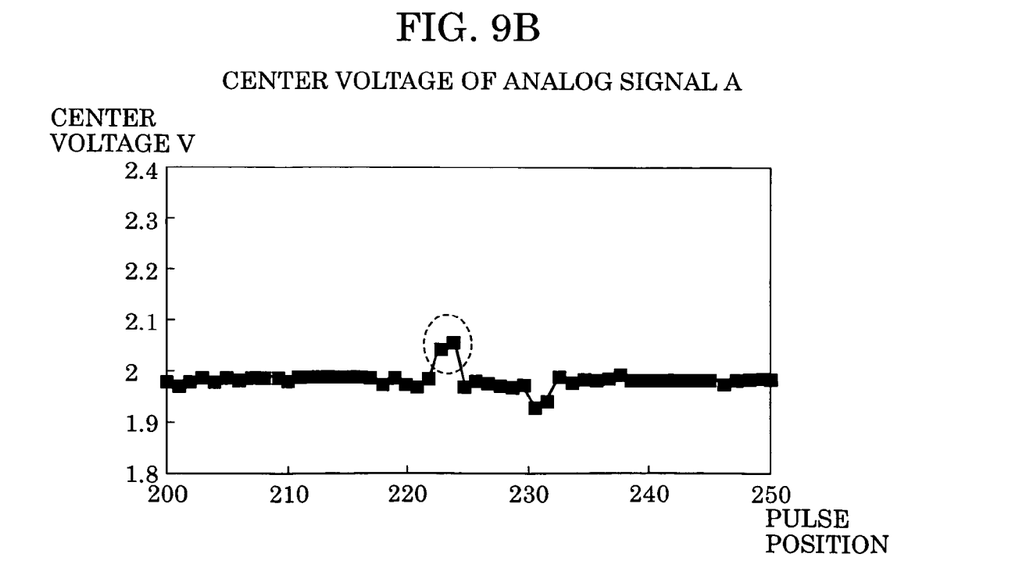

FIGS. 9A and 9B show the output waveforms of the analog signal A for explaining the third embodiment, which focuses on the center voltage of the analog signal A, instead of the signal amplitude discussed above. FIG. 9A shows the amplitude and center voltage of the analog signal A when the pulse position is plotted in the horizontal axis. FIG. 9B expands the horizontal axis and shows changes in the center voltage of the analog signal A when the discontinuous part 11a of the scale 11 passes through the sensor (i.e., the discontinuous part 11a passes the light emitting unit 12 and the light receiving unit 13 in the rotation of the scale 11).

As shown in FIG. 9B, the center voltage of the analog signal A rises to its positive peak when the discontinuous part 11a of the scale 11 enters the light-emitting unit 12 and the light-receiving unit 13, whereas it drops to its negative peak when the discontinuous part 11a exits the light-emitting unit 12 and the light-receiving unit 13.

Figure 10:
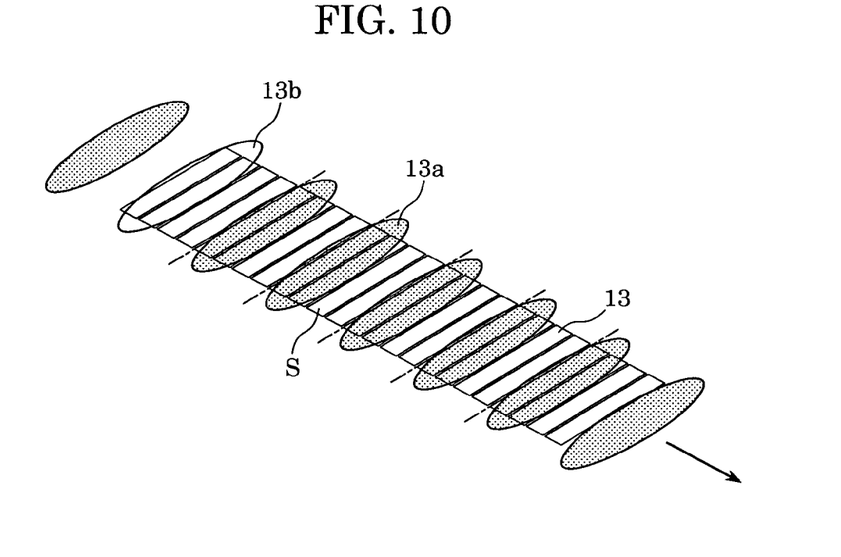
FIG. 10 shows the relationship between the pattern of a photodiode array and the detected pattern of light and shade.

FIG. 10 illustrates this phenomenon. When the area 13b corresponding to the discontinuous part 11a of the scale 11 is at the end of the light-receiving unit 13, an imbalance occurs between an area into which light enters and an area from which light is emitted, and as a result, offset components that should have been cancelled by the differential amplifiers 22 in FIG. 3 appear to some degree. Then variations in center voltage shown in FIG. 9B are detected.

Thus, a pulse position corresponding to a peak voltage (circled dotted line in FIG. 9B) can be determined as the origin.

As shown in FIG. 9A, there is no substantial change in the center voltage of the analog signal A despite the variations in amplitude. Stable origin detection can thus be achieved, as the center voltage of the analog signal A changes only when the discontinuous part 11a of the scale 11 passes through the sensor (i.e., the discontinuous part 11a passes the light emitting unit 12 and the light receiving unit 13 in the rotation of the scale 11).

Fourth Embodiment

Figure 11:
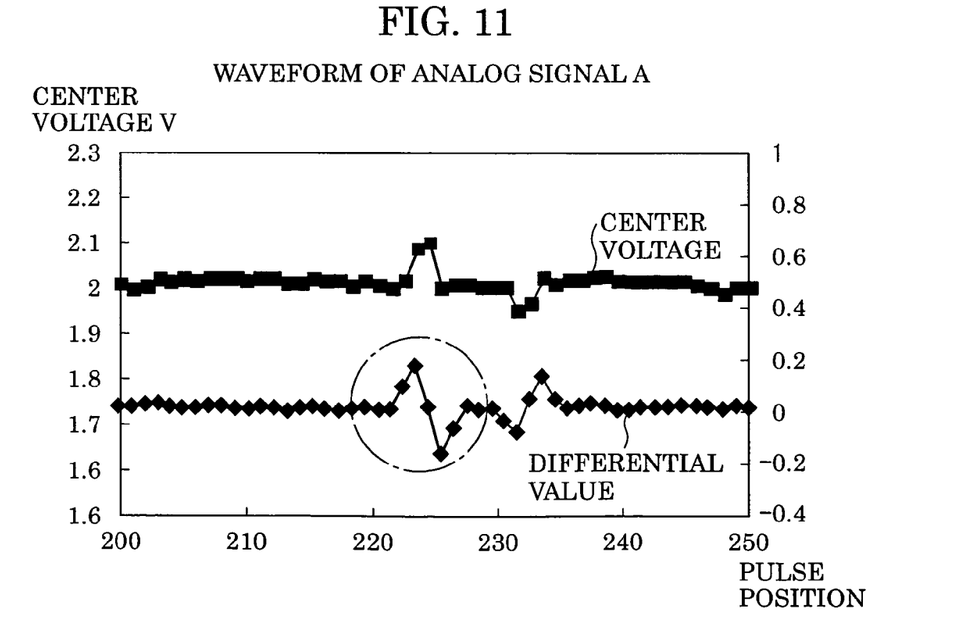
FIG. 11 is a waveform diagram showing the center voltage of an analog signal according to a fourth embodiment, and a signal obtained by the differentiation of the center voltage.

FIG. 11 shows a waveform of the center voltage of the analog signal A in the fourth embodiment, and a waveform obtained by differentiating the center voltage. As shown, more than one peak of the center voltage appears in FIG. 11. In this case, even if a peak of the center voltage is selected as described in the third embodiment, there will be a problem in that a peak value selected may be different depending on conditions.

Since the differential value of the center voltage of the analog signal A produces an S-shaped curve having upward and downward slopes, only a single point can be reliably determined to be the origin position, in the fourth embodiment, by determining a close-to-zero point on a downward slope following an upward slope as the origin. In FIG. 11, the 224th pulse position is determined to be the origin.

Here, there are two such close-to-zero points on the curve showing the result of differentiation, each point being located on a downward slope following an upward slope. If a determination cannot be made as to which to choose, a point closest to zero is initially selected as the origin, and then in the subsequent origin detection, a point having a value closest to that of the previous point is selected, thereby reliably determining the origin position.

Figure 12:
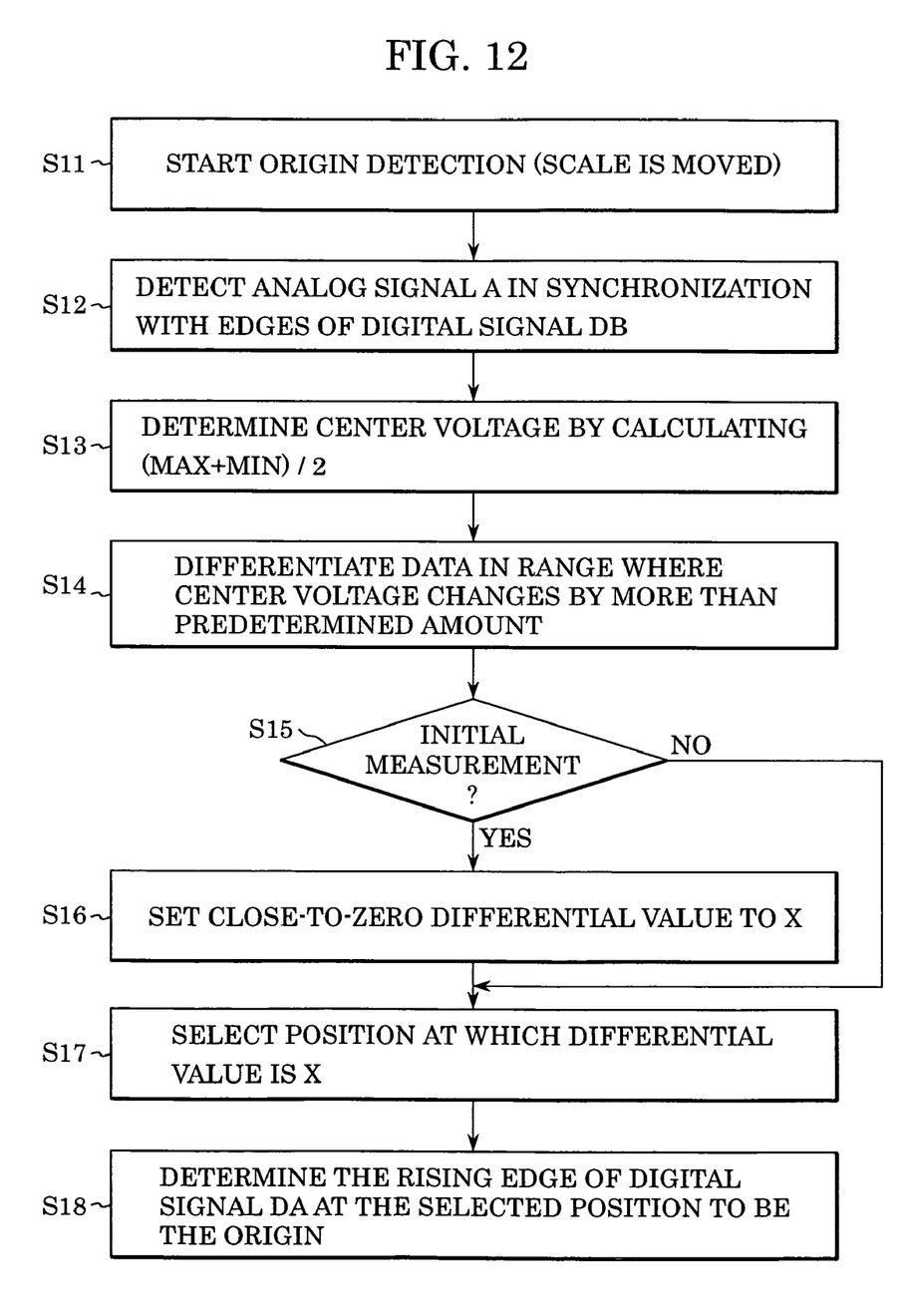
FIG. 12 is a flowchart of an algorithm for origin detection.

FIG. 12 is a flowchart of an algorithm for the origin detection according to the fourth embodiment. The origin detection starts in step S11, where the scale 11 is moved to generate signals. In step S12, the analog signal A is detected in synchronization with the rising and falling edges of the digital signal DB to determine the maximum and minimum values of the analog signal A.

In step S13, the center voltage is determined by dividing the sum of the maximum value and the minimum value by two. In step S14, data in a range where the center voltage changes by more than a predetermined amount is differentiated.

If it is determined in step S15 that this is the initial measurement, a pulse level corresponding to a close-to-zero differential value is determined to be the origin position and the differential value is stored as a differential value X in step S16. If it is determined in step S15 that this is not the initial measurement, a pulse position corresponding to the differential value X is selected in step S17. In step S18, a rising edge of the digital signal DA corresponding to the selected pulse position is determined to be the origin.

The origin position can thus be obtained with a high degree of accuracy by determining a certain pulse edge of a digital signal to be the origin position.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-177407 filed Jun. 15, 2004, which is hereby incorporated by reference herein.

What is claimed is:

1. An optical encoder comprising:
   a movable scale including an optical grating, the optical grating having a pitch and an optical discontinuous part;
   a plurality of light-receiving units each having the same number of light-receiving elements arranged in a relationship to the pitch of the optical grating, the light-receiving unit being disposed in a row in the moving direction of the scale;
   a light-emitting unit configured to apply a plurality of light beams via the scale to the plurality of light-receiving units at a predetermined interval corresponding to the pitch of the light-receiving units;
   a signal processing circuit processing signals obtained from the plurality of light-receiving units to generate two phased analog signals and two phased digital signals by combining the output signals from the light-receiving elements each located in the different light-receiving units and having the predetermined relation with each other, and obtaining an incremental signal from the two phased signals; and
   an origin-position detecting unit detecting an origin position of the optical encoder based on at least one of the two-phased analog signals and at least one of the digital signals,
   wherein the origin-position detecting unit detects a change in an output level of the at least one of the two phased analog signals obtained at an edge timing of at least one of the digital signals from the processing circuit when substantially no light beam is being applied to at least one of the light-receiving units due to the discontinuous part passing at a position having a relation with the light-receiving units and the light-emitting unit, and
   wherein the origin-position detecting unit detects the origin position by detecting a change in center voltage of the output of the signal processing circuit.

2. The optical encoder according to claim 1, wherein the origin-position detecting unit detects the origin position by determining a position corresponding to a peak value of the change in center voltage.

3. The optical encoder according to claim 1, wherein the origin-position detecting unit detects the origin position using a result obtained by differentiating the change in center voltage.

4. The optical encoder according to claim 1, wherein the origin-position detecting unit detects a point near a zero-crossing of values obtained by differentiating the change in center voltage as the origin position.

5. The optical encoder according to claim 1, wherein the origin-position detecting unit determines a point near a zero-crossing of values obtained by differentiating the change in center voltage as the origin position, stores a differential value at the point near the zero-crossing of values, and determines the origin position using the stored differential value.

6. The optical encoder according to claim 1, wherein the scale includes a micro-roof-mirror array.

* * * * *